June 9, 1953 S. B. WOOLARD 2,641,696
BINARY NUMBERS COMPARATOR
Filed Jan. 18, 1950
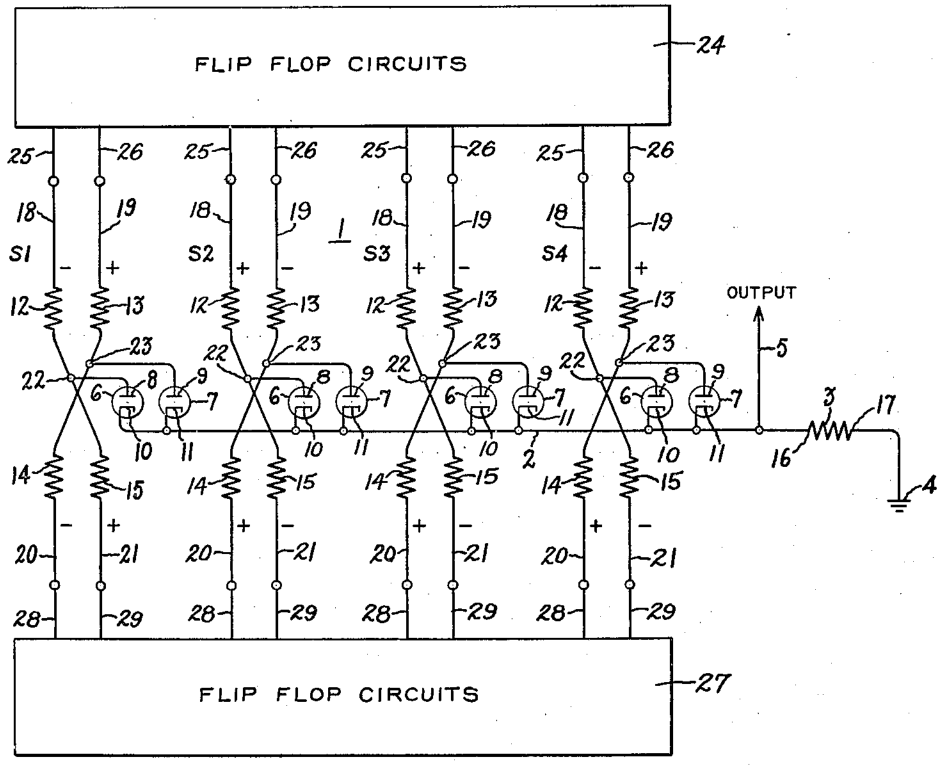
Inventor:
Simon B. Woolard,
by [signature]
His Attorney.

Patented June 9, 1953 2,641,696

UNITED STATES PATENT OFFICE 2,641,696

BINARY NUMBERS COMPARATOR

Simon B. Woolard, Schenectady, N. Y., assignor to General Electric Company, a corporation of New York Application January 18, 1950, Serial No. 139,272

9 Claims. (Cl. 250—27)

This invention relates to binary numbers comparators and has for its object the provision of a simple and reliable comparator providing a positive and instantaneous comparison of two binary numbers and developing one output voltage signal in response to a lack of identity and a different output voltage signal in response to an identity of two numbers being compared one with the other.

A further object is to provide a comparator for comparing one binary number with each of a series of binary numbers to determine which, if any, of the binary numbers are identical and for producing a different output voltage signal for identity and non-identity of the numbers being compared.

A still further object is to provide a comparator circuit for comparing the characters of two binary numbers one with the other and for developing a different output signal for identity and non-identity of the characters compared.

In general, my invention comprises a plurality of comparator stages, connections for connecting each stage to separate selective sources of voltage to represent in each stage the corresponding digits of two binary numbers, and common output means and grounded resistor means electrically interconnecting the stages to provide cooperation therein in producing one output voltage signal in response to a lack of identity of the two binary numbers being compared and a second voltage signal in response to an identity thereof.

For a complete understanding of my invention, reference should be had to the following specification and the accompanying drawing in which similar elements are given the same character reference throughout the drawing.

In the drawing, the single figure thereof is a diagrammatical view of a circuit for the comparison of four digit binary numbers and is illustrative of my invention.

Referring to the single figure of the drawing, I have shown therein a binary electronic comparator circuit 1 comprising a plurality of electric circuits which I call comparator stages numbered S1—S4 corresponding to the respective digits of four digit binary numbers to be compared one with the other, a conductor 2, a resistor 3, a ground 4 and an output conductor 5.

Each of the comparator stages S1—S4 comprises a pair of associated rectifiers each having an input electrode and an output electrode and each becoming conductive when a predetermined positive voltage is applied to the input electrode.

Any suitable rectifying means, as for example, a simple electronic tube having an anode and a cathode and arranged to become conductive when a predetermined positive voltage is applied to its anode, or a germanium rectifier, may be used. In the preferred embodiment of my invention shown, I have employed a pair of electronic tube rectifiers numbered 6 and 7 having input electrodes or anodes 8 and 9 and output electrodes or cathodes 10 and 11 respectively. Each of the comparator stages S1—S4 also comprises a first and a second pair of associated resistors preferably of substantially equal resistance value and numbered respectively 12 and 13, and 14 and 15. The resistors 12—15 are electrically connected in pairs to the anodes 8 and 9 of the tubes 6 and 7, as shown in the drawing, and the cathodes 10 and 11 of the associated pairs of tubes 6 and 7 are electrically connected through the conductor 2 to the output conductor 5 and one side 16 of the resistor 3. The other side 17 of resistor 3 is electrically connected to the ground 4. Grounded resistor 3 and output conductor 5 are thus common to cathodes 10 and 11 of the tubes 6 and 7 of stages S1—S4. A plurality of pairs of input conductors 18 and 19 are electrically connected respectively to the pairs of resistors 12 and 13 and a second plurality of pairs of input conductors 20 and 21 are electrically connected respectively to the pairs of resistors 14 and 15.

Those skilled in the art will understand that the digit characters of a binary number being 0 and 1 such characters may be represented by the voltage relation positive and negative on two conductors. That is, the binary character 0 may be represented in conductors 18 and 19 by the relation of conductor 18 positive and conductor 19 negative and the binary character 1 may be represented by conductor 18 negative and conductor 19 positive. By the same notation, the voltage relation of conductor 20 positive and conductor 21 negative may represent the binary character 0 and the reverse voltage relation the binary character 1.

In operation, the binary comparator circuit 1 forms one component of a digital calculating device (not shown) in which two binary numbers to be compared one with the other are stored in flip-flop circuits or other suitable two-state double-voltage-output devices. A first plurality of flip-flop circuits shown in block form at 24, for example, may represent, by the polarity of the outputs 25 and 26 thereof a first binary number and a second plurality of flip-flop circuits shown in block form at 27 may represent by the polarity of the outputs 28 and 29 thereof a second binary number. To compare the first binary number with the second binary number, input conductors 18 and 19 of circuit 1 may be electrically connected to the outputs 25 and 26 of the first plurality of flip-flop circuits 24 of the calculating device in a predetermined order and excited therefrom to represent in conductors 18 and 19 the digit characters of the first binary number, and the outputs 28 and 29 of the second plurality of flip-flop circuits 27 may be electrically connected to the conductors 20 and 21 to represent therein the digit characters of the second binary number.

For example, assume the binary number 1001 is to be compared with the binary number 1000 by the comparator circuit 1. In such case, the conductors 18 and 19 of stages S1 and S4 are excited, as for example from flip-flop circuits 24 to make conductors 18 negative and conductors 19 positive thereby storing in the pairs of conductors 18 and 19 of stages S1 and S4 the binary characters 1. The second and third digit characters being 0 the inputs 18 and 19 of stages S2 and S3 are excited to make conductors 18 positive and conductors 19 negative. The voltage relation above defined for conductors 18 and 19 of stages S1—S4 is indicated in the drawing by positive and negative signs for convenience of the reader. With respect to the second binary number, 1000, the first digit corresponding to stage S1 is 1 and, therefore, the conductors 20 and 21 of stage S1 are excited from flip-flop circuits 27 to make conductor 20 negative and conductor 21 positive. The second, third and fourth digits of the second binary number being 0, the conductors 20 and 21 of the stages S2, S3 and S4 are excited from flip-flop circuits 27 to make conductors 20 positive and conductors 21 negative. The resulting voltage relation of conductors 20 and 21 is indicated by positive and negative signs in the drawing for convenience of the reader.

Considering the operation of the comparator circuit 1 for the campison of the two binary numbers 1001 and 1000 represented respectively by the voltage relation of input conductors 18 and 19, and 20 and 21 as indicated in the drawing, it will be noted that anode 8 of tube 6 of stage S1 is electrically connected at a point 22 preferably electrically equidistant between negative input conductor 18 and positive input conductor 21 of stage S1. Assuming the positive and negative polarities are of equal value with respect to ground at zero voltage, the voltage on anode 8 tube 6 of stage 1 is therefore zero and tube 6 remains non-conductive. It will be further noted that anode 9 of tube 7 of stage S1 is electrically connected at a point 23 electrically equidistant between positive input conductor 19 and negative input conductor 20 of stage S1. Therefore, the voltage on anode 9 of tube 7 of stage 1 is zero and tube 7 remains non-conductive. As to stages S2 and S3 it may be seen that anodes 8 and 9 of the tubes 6 and 7 are electrically connected respectively at points 22 and 23 corresponding to points 22 and 23 of stage S1 and electrically equidistant between oppositely biased input conductors and therefore tubes 6 and 7 of stages S2 and S3 remain non-conductive. However, with respect to tubes 6 and 7 of stage S4, although the anode 8 of tube 6 is electrically connected at a point 22 preferably electrically equidistant between negative biased input conductors 18 and 21 thereby maintaining tube 6 in non-conductive condition, anode 9 of tube 7 of stage S4 is electrically connected at a point 23 electrically equidistant between positively biased input conductors 19 and 20 and therefore receives a voltage sufficiently positive to initiate conduction in tube 9 of stage 4. Thus, a positive voltage signal indicating a lack of identity of the two binary numbers being compared is transmitted through conductor 2 to output conductor 5 to be used to ionize a neon tube, for example, to give a visual signal of lack of identity or to be used to operate a unit such as a register, of a digital calculating device, or for any other suitable purpose.

The grounded resistor 3 is electrically connected to conductor 2 to return the voltage of output conductor 5 to zero when all of the tubes 6 and 7 are returned to non-conductive condition. Grounded resistor 3 is also desirable where germanium rectifiers are used in place of the tubes 6 and 7 to prevent a possible false positive voltage signal on output conductor 5 otherwise developing from leakage current through the rectifiers. Although the grounding of resistor 3 is preferable in many cases, it should be noted that, depending upon the constants of the comparator circuit, resistor 3 may be connected to voltages other than ground but lower than the positive output voltage signal applied to output conductor means 5. A portion of the flip-flop circuits 24 and 27 are grounded to provide a return circuit from the comparator circuit 1 through the ground 4 to the flip-flop circuits 24 and 27.

Flip-flop circuits which may be used in such a system are well known. One circuit which could be used, for instance, is that disclosed in Fig. 5 of an article entitled "Electronic computing circuits of the ENIAC" by Arthur W. Burks, appearing at pages 756 to 767 of the Proceedings of the I. R. E. for August 1947.

In the event that the binary numbers being compared are identical, then the voltage on output conductor 5 remains or is returned to zero voltage depending upon whether two preceding binary numbers compared are identical or lacked identity. For example, assume that the last digit of the second binary number 1000 is changed to 1. That is, assume a comparison is being made of two identical binary numbers 1001 and 1001. In this case, the voltage relation of input conductors 20 and 21 of stage S4 is reversed to represent therein the binary character 1 thereby making input conductor 20 negative and input conductor 21 positive. Considering the resultant voltage relation in stage S4 of input conductors 18 negative, 21 positive, 19 positive, and 20 negative it is seen that the voltage on anodes 8 and 9 of respective tubes 6 and 7 is zero. Therefore, tube 6 remains non-conductive and tube 7 returns to non-conductive condition. The voltage on output conductor 5 therefore returns to zero. Thus, where a first binary number is stored in conductors 18 and 19 of stages S1—S4 and a series of binary numbers are successively stored in conductors 20 and 21 as long as each of the series of numbers is not identical to the first binary number a predetermined positive voltage is maintained on output 5 indicating a lack of identity of numbers being compared. However, when a number identical to the first number appears in the series, the voltage of output conductor 5 is lowered to zero voltage thereby indicating an identity of numbers being compared.

To compare binary members having more or less than four digits, the number of stages is increased or decreased to correspond with the number of digits in each number.

Therefore, in accordance with my invention, I have provided a simple, reliable, inexpensive comparator circuit for obtaining a positive and instantaneous comparison of two binary numbers and for developing one output voltage signal in response to a lack of identity and a different output voltage signal in response to an indentity of two numbers being compared.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim to be new and desire to secure by United States Letters Patent is:

1. A binary numbers comparator for comparing two binary numbers one with the other and for developing one output voltage signal in response to a lack of identity and a different output voltage signal in response to an identity of the two numbers being compared comprising a plurality of pairs of rectifiers, said rectifiers each having an input and an output electrode and becoming conductive in response to a predetermined positive voltage applied to said input electrode, a common output means electrically connected to said output electrodes of all of said pairs of rectifiers, a common grounded resistor means electrically connected to said output electrodes of all of said pairs of rectifiers, a first and a second pair of resistors for each pair of rectifiers, connections for electrically connecting one of each of said pairs of resistors to a different one of the input electrodes of its associated pair of rectifiers, and connections for connecting each pair of resistors to a source of selective voltage representing a particular binary character.

2. A binary numbers comparator comprising a plurality of pairs of rectifiers, said rectifiers each having an input and an output electrode and becoming conductive in response to a predetermined positive voltage applied to said input electrode, two resistor means for each of said pairs of rectifiers, an electric connection between an intermediate point of each of said resistor means and the input electrode of a different one of its said pair of rectifiers, a common output conductor connected to the output electrodes of all of said pairs of rectifiers, a resistor, a ground connection for said output conductor including said resistor, and connections for applying voltages of said predetermined value with respect to ground having polarities representing the corresponding digits of two binary numbers to opposite terminals of said resistor means so that the rectifiers of each of said pairs are rendered conducting or non-conducting and vary the energization of said output conductor in accordance with the identity of said numbers.

3. A binary numbers comparator comprising a plurality of pairs of rectifiers, said rectifiers each having an input and an output electrode and becoming conductive in response to a predetermined positive voltage applied to said input electrode, two resistor means for each of said pairs of rectifiers, an electric connection between an intermediate point of each of said resistor means and the input electrode of a different one of its said pair of rectifiers, a common output conductor connection to the output electrodes of all of said pairs of rectifiers, a resistor, a ground connection for said output conductor including said resistor, and connections for applying voltages of said predetermined value with respect to ground having polarities representing the corresponding digits of two binary numbers to opposite terminals of said resistor means so that at least one of the rectifiers of each of said pairs is conducting when its digits are not identical but both of said rectifiers are non-conducting when its digits are identical whereby said output conductor is deenergized when the numbers are identical.

4. A binary numbers comparator for comparing two binary numbers one with the other and for developing one output signal in response to a lack of identity and a different output voltage signal in response to an identity of the two numbers being compared comprising a plurality of comparator stages, each of said stages comprising a pair of rectifiers, said rectifiers each having an input and an output electrode and becoming conductive in response to a predetermined positive voltage applied to said input electrode, a first and a second pair of resistors for each stage, connections for connecting the input electrode of each rectifier of each pair of rectifiers to a different resistor of each of said first and second pairs of resistors associated with said pair of rectifiers, a common output conductor means electrically connected to the output electrodes of all of said pairs of rectifiers of said plurality of stages, and connections for connecting said pairs of resistors of each of said stages each to particular separate sources of selective voltage bias representing the digit characters of corresponding binary digits of said two binary numbers.

5. An electronic comparator for comparing two binary numbers one with the other and for developing one output signal in response to a lack of identity and a different output voltage signal in response to an identity of the two numbers being compared comprising a plurality of comparator stages, each of said stages comprising a pair of electronic tubes, an anode and a cathode in each of said tubes, a first and a second pair of resistors for each of said stages, connections for connecting the anode of each tube of each of said pairs of tubes to a different resistor of each of said first and second pairs of resistors associated with each of said pairs of tubes, a common output conductor means and a common grounded resistor means electrically connected to the cathodes of all of said pairs of tubes of said plurality of stages, and connections for connecting said pairs of resistors of each of said stages each to particular separate sources of selective voltage bias representing the digit characters of corresponding binary digits of said two binary numbers.

6. A binary numbers comparator for comparing two binary numbers one with the other and for developing one output signal in response to a lack of identity and a different output signal in response to an identity of the two binary numbers comprising a plurality of comparator stages, a first and a second pair of resistors in each stage, a pair of rectifiers in each stage, said rectifiers each having an input and an output electrode and becoming conductive in response to a predetermined positive voltage applied to said input electrode, connections for connecting said first pairs of resistors each to a different one of a plurality of sources of selective voltages each representing the character of a particular digit of one binary number, connections for connecting said second pairs of resistors in a predetermined order each to a different one of a second plurality of selective sources of voltage each representing the character of a corresponding digit of the other binary number, connections for electrically connecting one resistor of each of the first and second pairs of resistors of each stage to the input electrode of one rectifier of the pairs of rectifiers of that stage and for electrically connecting the other resistor of each of said first and second pair of resistors of the same stage to the input electrode of the other rectifier of said pairs of rectifiers of that stage to compare the characters of corresponding digits of said two binary numbers, and a common output means electrically connected to the output electrodes of all of said pairs of rectifiers to provide cooperation between said stages in producing said different output voltage signals.

7. A binary numbers comparator for comparing one binary number with each of a series of binary numbers and for developing one output voltage signal in response to a lack of identity and a different output voltage signal in response to an identity of each two binary numbers being compared comprising a plurality of comparator stages, a first and a second pair of resistors in each stage, a pair of rectifiers in each stage, said rectifiers each having an input and an output electrode and becoming conductive in response to a predetermined positive voltage applied to said input electrode, connections for connecting said first pairs of resistors each to a different one of a plurality of selective sources of voltage each representing the character of a particular digit of said one binary number, connections for electrically connecting said second pairs of resistors in a predetermined order each to a different one of a second plurality of selective sources of voltage each representing successively the character of a corresponding digit of each of said series of binary numbers, connections for electrically interconnecting in a predetermined order said first and second pair of resistors and said pair of rectifiers of each comparator stage to compare the characters of corresponding digits of said one number and each of said series of numbers, and a common output means electrically connected to the output electrodes of all of said pairs of rectifiers of said comparator stages to provide cooperation between said stages in producing said different output signals.

8. A comparator for comparing the characters of two binary digits and for developing one output voltage signal in response to a lack of identity and a different output voltage signal in response to an identity of said digit characters comprising a first and second pair of resistors, a pair of rectifiers, said rectifiers each having an input and an output electrode and becoming conductive in response to a predetermined voltage applied to said input electrode, an output conductor common to said output electrodes, connections for connecting said input electrodes each to a different resistor of said pairs of resistors, and connections for connecting said first pair of resistors to a first selective source of voltage and said second pair of resistors to a second selective source of voltage to apply to each pair of resistors a voltage relation representative of the character of a different one of said two binary digits.

9. A binary numbers comparator for comparing two multiple digit binary numbers comprising a two state unit for each digit of each number to be compared, said two state units each including first and second output terminals and adapted for applying a first voltage to said first terminal and a second voltage to said second terminal for one state of said unit and for reversing said voltages to apply said second voltage to said first terminal and said first voltage to said second terminal for the other state of said unit, interconnection circuits between those of said two state units representing corresponding digits in the multiple digit binary numbers being compared comprising a cross-connection circuit from each of said first output terminals to the second output terminal of the corresponding two state unit, said connections each including two series connected impedances of equal magnitude, a rectifier element having one terminal connected to each of said circuits at a point intermediate said two impedances, all of said rectifier elements having their other terminals connected together to a common output circuit, and said output circuit being connected through another impedance to a return circuit having a voltage midway between said first and second voltages.

SIMON B. WOOLARD.

References Cited in the file of this patent

UNITED STATES PATENTS

| Number | Name | Date |
|---|---|---|
| 2,393,386 | Leathers et al. | Jan. 22, 1946 |
| 2,438,588 | Tolson | Mar. 30, 1948 |
| 2,484,081 | Dickinson | Oct. 11, 1949 |
| 2,487,603 | Scoles | Nov. 8, 1949 |
| 2,501,821 | Kouzmine | Mar. 28, 1950 |
| 2,533,242 | Gridley | Dec. 12, 1950 |

FOREIGN PATENTS

| Number | Country | Date |
|---|---|---|
| 422,143 | Great Britain | Jan. 7, 1935 |